United States Patent
Telford et al.

(10) Patent No.: US 7,168,119 B1
(45) Date of Patent: Jan. 30, 2007

(54) AIRCRAFT PASSENGER BOARDING BRIDGE HAVING A CHUTE FOR TRANSPORT OF BAGGAGE BETWEEN BOARDING BRIDGE AND GROUND LEVEL

(76) Inventors: Richard L Telford, P.O. Box 788, Hammond, LA (US) 70404; Johnnie C. Telford, P.O. Box 788, Hammond, LA (US) 70404

( * ) Notice: Subject to any disclaimer, the term of this patent is extended or adjusted under 35 U.S.C. 154(b) by 0 days.

(21) Appl. No.: 11/201,963

(22) Filed: Aug. 11, 2005

(51) Int. Cl.
*E01D 15/10* (2006.01)
(52) U.S. Cl. ........................................ 14/71.5
(58) Field of Classification Search .............. 14/71.5, 14/69.5, 71.1
See application file for complete search history.

(56) References Cited

U.S. PATENT DOCUMENTS

| | | | |
|---|---|---|---|
| 3,404,417 | A | 10/1968 | Wollard et al. |
| 3,827,590 | A | 8/1974 | Lodjic |
| 6,109,854 | A | 8/2000 | Thompson, Jr. et al. |
| 6,122,789 | A | 9/2000 | Stephenson et al. |
| 6,390,757 | B2 | 5/2002 | Ganiere |
| 6,401,901 | B1 | 6/2002 | Bracken et al. |
| 6,658,685 | B1 | 12/2003 | Ratliff et al. |
| 6,676,359 | B2 | 1/2004 | Ganiere |
| 6,802,096 | B2 | 10/2004 | Savage |
| 6,928,684 | B2 | 8/2005 | Ratliff et al. |
| 2001/0007631 | A1 | 7/2001 | Ganiere |
| 2002/0060119 | A1 | 5/2002 | Bracken et al. |
| 2003/0219329 | A1 | 11/2003 | Ganiere |

*Primary Examiner*—Raymond W. Addie
(74) *Attorney, Agent, or Firm*—Roy, Kiesel, Keegan and DeNicola (57) ABSTRACT

An improved aircraft passenger boarding bridge is constructed wherein the bridge cabin has at least one side wall in which is installed a baggage chute assembly pivotally attached at its lower end to the bridge cabin wall to permit the assembly to be pivoted outward from the bridge cabin and toward the ground.

18 Claims, 6 Drawing Sheets

AIRCRAFT PASSENGER BOARDING BRIDGE HAVING A CHUTE FOR TRANSPORT OF BAGGAGE BETWEEN BOARDING BRIDGE AND GROUND LEVEL

BACKGROUND OF THE INVENTION

1. Field of the Invention

This invention relates in general to apparatus and methods to assist in the transport of luggage and other baggage to and from an aircraft passenger boarding ramp or bridge to ground level for storage into and out of the baggage compartment of an aircraft. More particularly it relates to an improved bridge cabin construction having means to facilitate the quick, safe and efficient transport of luggage and other baggage from the bridge cabin to ground level and from the ground level back into the bridge cabin.

2. Prior Art

The most common way to board passengers into modern jets is to utilize an elevated passenger boarding bridge or boarding ramp. Most bridges include a covered walkway or tunnel that connects at one end to an airport terminal building where passengers gather to board an aircraft. The walkway in most cases comprises multiple sections that can be manipulated to telescope outward toward a parked aircraft. In most cases there will be a bridge cabin attached to the other end of the walkway. In many instances the bridge cabin will have a round compartment commonly referred to as the "bubble cabin" that contains the bridge control equipment and has a passageway for the passengers to pass. It is also common for the bridge cabin to have a forward cabin extending from the bubble cabin. The forward cabin is sometimes referred to as a "vestibule" or "cab." The forward cabin extends outward from the bubble cabin and has a ramp or floor section that is aligned with the aircraft passenger doorway to permit passengers to and from the aircraft from the bubble cabin. In many cases the forward cabin is constructed to permit the ramp or floor section to tilt or rotate for better alignment with the aircraft boarding doorway. The forward cabin also generally includes an accordion-type canopy extending from the bubble cabin frame that can be extended to rest on the aircraft fuselage about the boarding doorway of the aircraft to provide cover for the passengers passing through the forward cabin. In some bridges there will be an outside stairway connected to the bridge cabin through a bubble cabin or forward cabin doorway to permit airline personnel to gain quick access to the bridge cabin from ground level, or in an emergency permit passengers to exit the bridge or the bridge cabin through the doorway. More modern bridge cabins are constructed wherein the forward cabin can independently move sideways and/or have floor panels that can independently be extended or retracted to permit better alignment with the aircraft boarding doorway. U.S. Pat. Nos. 6,122,789 and 6,802,096 illustrate examples of such modern bridge cabs.

Due to various safety regulations, the luggage or other baggage that passengers may bring into the aircraft passenger compartment is limited in the type, size and number of articles. It is not uncommon for a passenger to enter the boarding bridge with such items that can not be permitted into the aircraft passenger compartment. In such a case it is necessary that the items be checked and loaded into the aircraft baggage compartment. This is commonly referred to as the "late bag" problem.

The earlier solutions to the late bag problem was to have the airline personnel check the articles in the bridge cabin and then hand carry the articles down the adjoining stairway to the ground level where it could then be picked up for loading into the aircraft baggage compartment. U.S. Pat. No. 3,404,417 illustrates such a stairway adjoining the bridge cabin that could be used for that purpose. However, this method of handling the late bag problem was never efficient, nor in all cases, safe for the airline personnel who had to carry the articles up and down the stairway. Other early solutions to this problem included the mounting of a baggage loader to the side of the elevated walkway near the bridge cabin. The baggage loader was provided with a loading opening aligned with an access opening in one wall of the walkway to permit articles to be placed into the baggage loader. Once the baggage loader was full, or when all the passengers were boarded, a panel or other means would be activated to seal off the access opening, then one end of the baggage loader would 1 be pivotally lowered to the ground level where the articles could be retrieved and loaded into the aircraft baggage compartment. U.S. Pat. No. 3,827,590 illustrates such a baggage loader. However, such baggage loaders created potential safety hazards if the baggage was left in the walkway or if airline personnel were required to be positioned in the walkways to load the baggage into the baggage loader. Additionally, the need for more compact and safer structures, as well as structures located nearer the aircraft remained.

More recent attempts to resolve the late bag problem include the use of various chutes positioned alongside the bridge cabin access stairway. U.S. Pat. Nos. 6,109,854, 6,390,757, 6,401,901, and 6,676,359, as well as U.S. Patent Application Publication Nos. 2001/0007631, 2002/0060119, and 2003/0219329 illustrate such constructions. However, such constructions result in a number of late bags being accumulated in the bridge cabin before any airline personnel is available to remove the accumulated bags. This can create an unsafe area increasing the likelihood that a passenger or airline person to trip and fall over the bags. This construction also requires the airline personnel to leave the bridge cabin in order to load the articles onto the chutes, thus creating an increased security risk from not being able to monitor the movement of the passengers into and out of the aircraft. Because of their weight and/or shape, the bags can be difficult to lift and position on many of these chutes and thus increase the likelihood of injury to the airline personnel. Additionally, such chute constructions are not compact and are positioned, even when not in use, to more likely to be damaged by baggage transport carts or other ground level vehicles that move about the bridge and aircraft area. Thus, there remains a need by the airline industry for a simpler, more efficient, and safer means to solve the late bag problem.

OBJECTS AND SUMMARY OF THE INVENTION

Therefore, one object of this invention is to provide an aircraft passenger loading bridge cabin having a wall structure that can be converted into a chute to transport luggage or other baggage carried onto the bridge back to ground level for convenient loading into the cargo hold of the aircraft serviced by the bridge.

A further object of this invention is to provide a bridge cabin provided with a chute to transport luggage or other baggage to ground level having means to prevent damage to the chute during use by operation of the bridge or bridge cabin.

Another object of this invention is to provide a chute forming part of the bridge cabin for transporting luggage or other baggage from the bridge cabin to ground level that is compact when not in use and positioned to minimize any damage to the chute by ground level vehicles.

Still another object of this invention is to provide a chute for transporting luggage or other baggage from the bridge cabin to ground level that is positioned for use in a manner that reduces accidental injury to ground personnel during the positioning operation.

A still further object of this invention is to provide a chute that permits bridge cabin personnel to safely, quickly and efficiently load luggage or other baggage on the chute for transport to and from the ground level.

Another object of this invention is to provide a method of transporting luggage or other baggage from the bridge cabin to and from the ground level safely, quickly, and efficiently.

Other objects and advantages of this invention shall become apparent from the ensuing descriptions of the invention.

Accordingly, this invention in one embodiment an improved aircraft passenger boarding bridge is provided that includes a bridge cabin constructed of side walls wherein one of the side walls has a generally rectangular chute assembly pivotally attached at its lower end to the bridge cabin to permit the assembly to be pivoted outward from the bridge cabin and toward the ground. In those cases wherein the bridge cabin includes a revolving bubble cabin and a forward cabin, the chute assembly is pivotally attached at its lower end to one of the side walls making up the either the bubble cabin or the forward cabin. It is preferred that the chute assembly be pivotally attached to a side wall facing toward the rear of the aircraft when the bridge cabin is positioned to permit passengers to board or deplane through the aircraft doorway.

In a preferred embodiment the chute assembly is constructed having a flat bottom plate with side bumper plates extending upward from the bottom plate to form a U-shaped chute sized to permit baggage or other articles to slide downward within the chute. In a more preferred embodiment a conveyor roller unit or a conveyor belt unit or other similar device is mounted to the bottom plate to assist in a conventional manner the movement of any baggage or other articles downward in the chute. In another preferred embodiment the raising and lowering of the rectangular section is controlled by a control unit positioned for use by a person located at ground level. Alternatively, a conventional sensor device, such as a laser beam sensor or similar type sensor, can be positioned to detect when a bag has reached the lower end section of the chute. The sensor is operatively connected to the conveyor belt unit to permit the conveyor belt unit to be started or stopped upon receiving a predetermined signal from the sensor. In still another preferred embodiment a bumper plate is fixed across the side bumper plates at the end to be lowered to prevent the baggage or other articles from exiting the chute and striking the ground.

BRIEF DESCRIPTION OF THE DRAWINGS

The accompanying drawings illustrate a preferred embodiment of this invention. However, it is to be understood that these embodiments are not intended to be exhaustive, nor limiting of the invention. They are but examples of some of the forms in which the invention may be practiced.

PREFERRED EMBODIMENTS OF THE INVENTION

Without any intent to limit the scope of this invention, reference is made to the figures in describing the preferred embodiments of the invention.

Figures 1, 5:
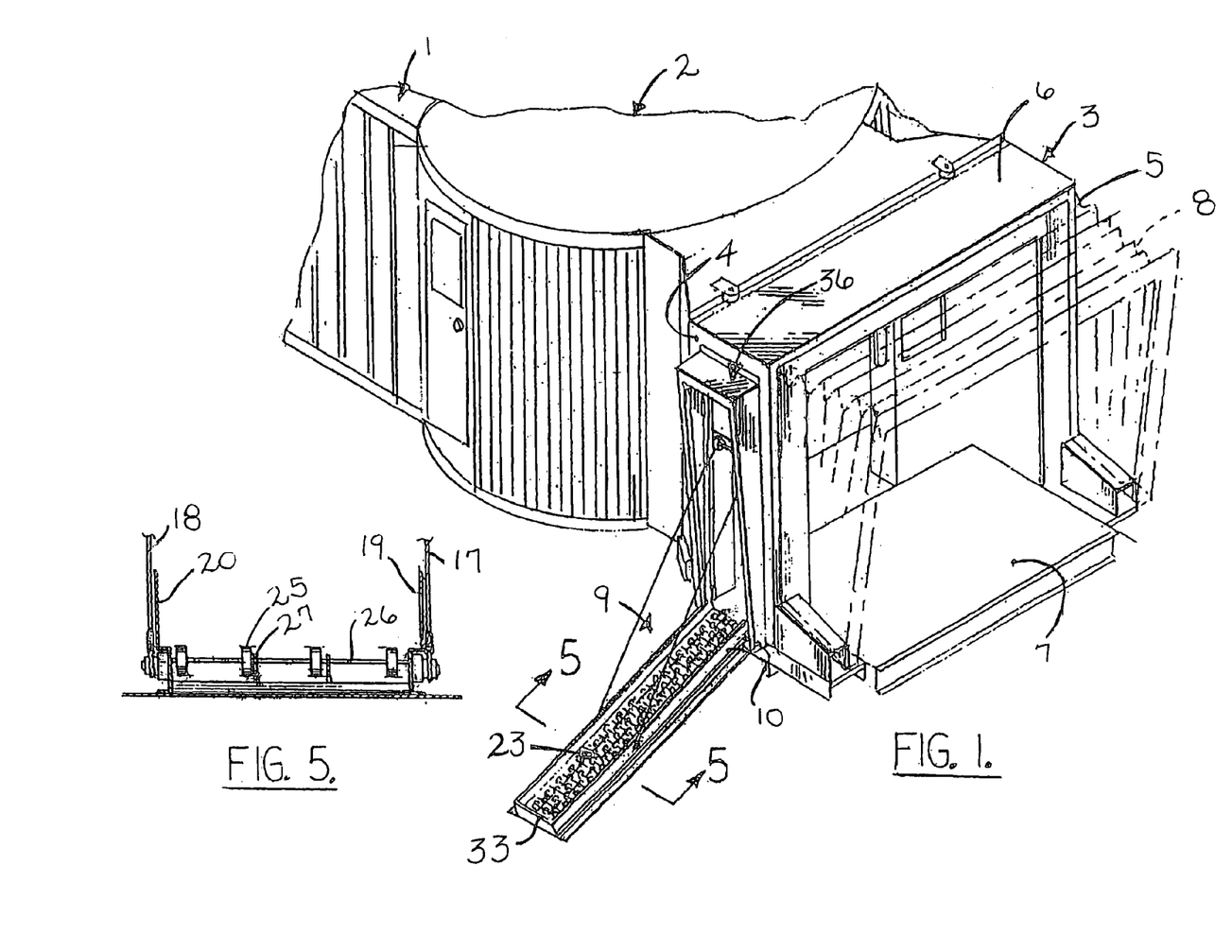
FIG. 1 is a three-quarter perspective view of a bridge cabin having a forward cabin to which the chute assembly is pivotally attached to one of the forward cabin wall panels.
FIG. 5 is a cross-sectional view taken along section lines 5—5 in FIG. 1.
Figure 2:
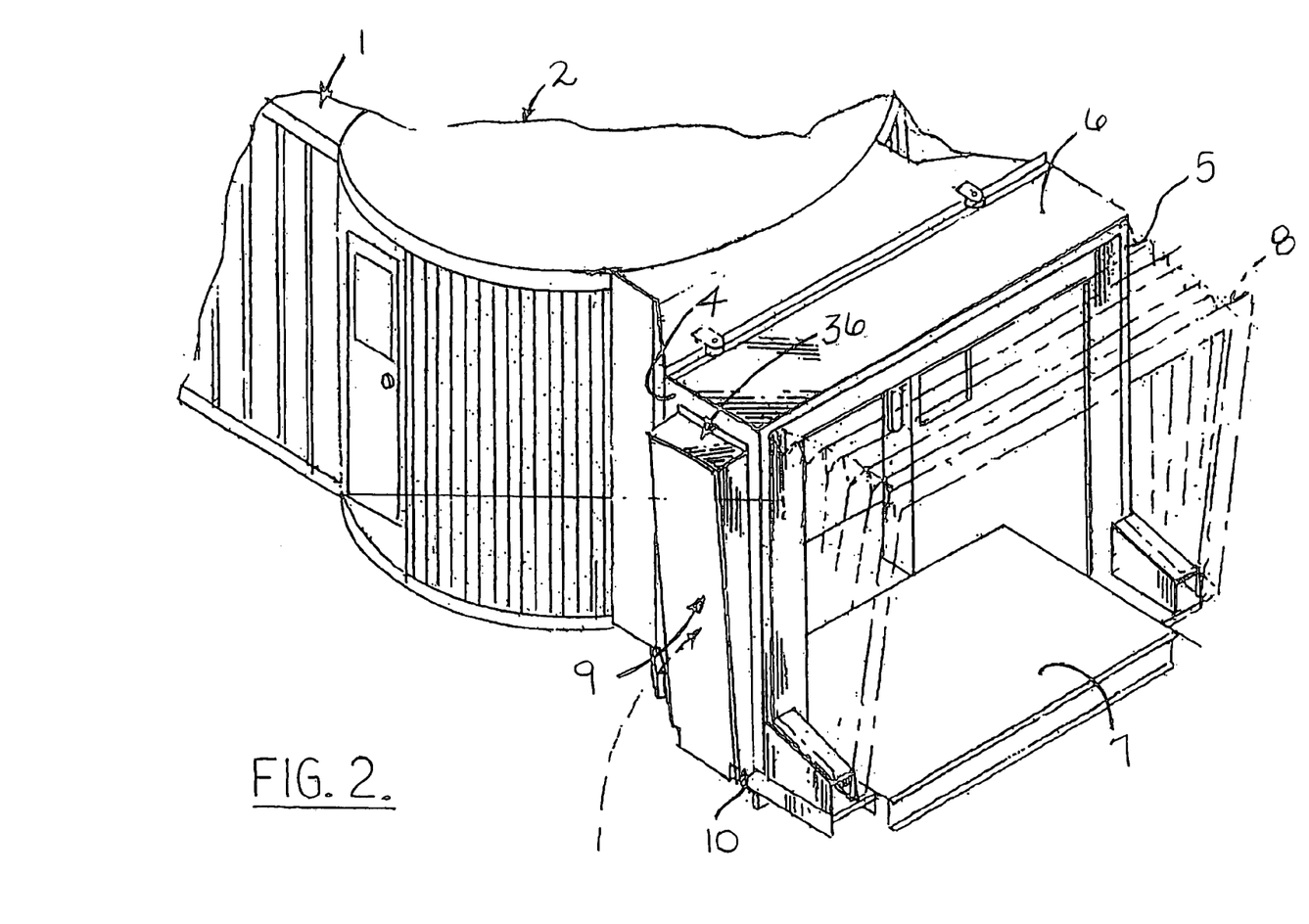
FIG. 2 is a view of the bridge cabin in FIG. 1, but with the chute assembly in a vertical position for lowering.

Referring now to FIGS. 1 and 2, attached to a telescoping bridge section 1 is a conventional bridge having a bubble cabin 2 provided with a forward cabin 3. Forward cabin 3 includes side walls 4 and 5, roof panel 6, floor 7 and canopy 8. Side wall 4 is provided with the chute assembly 9 of this invention. Chute section 9 is illustrated as being pivotally attached at its lower end by shaft 10 to side wall 4 and extended downward toward the ground.

Figures 3, 4:
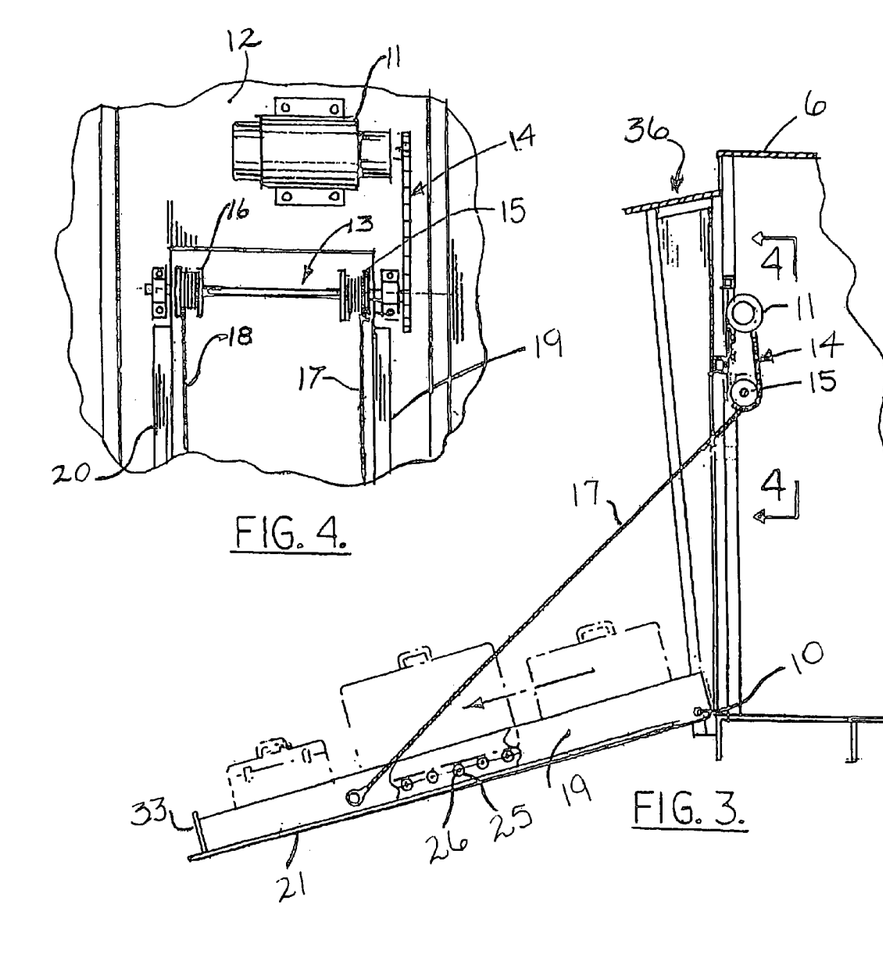
FIG. 3 is a cutaway side view of the chute in a lowered position illustrating baggage sliding down on a conveyor roller unit.
FIG. 4 is cross-sectional view taken along section lines 4—4 in FIG. 3.
Figure 6:
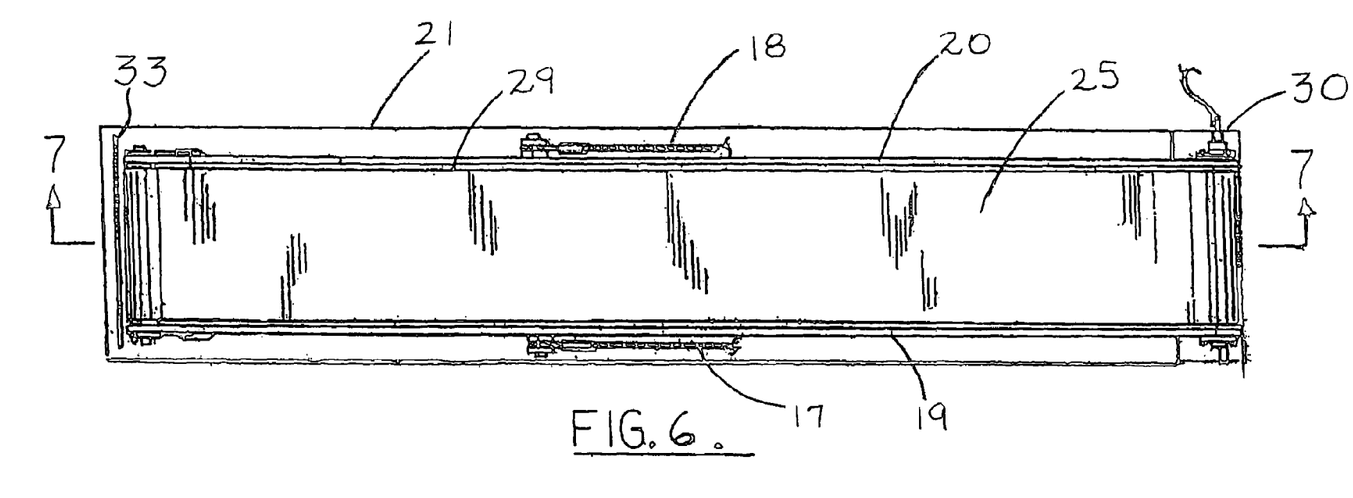
FIG. 6 is a top view of a conveyor belt unit affixed in the chute.
Figure 7:
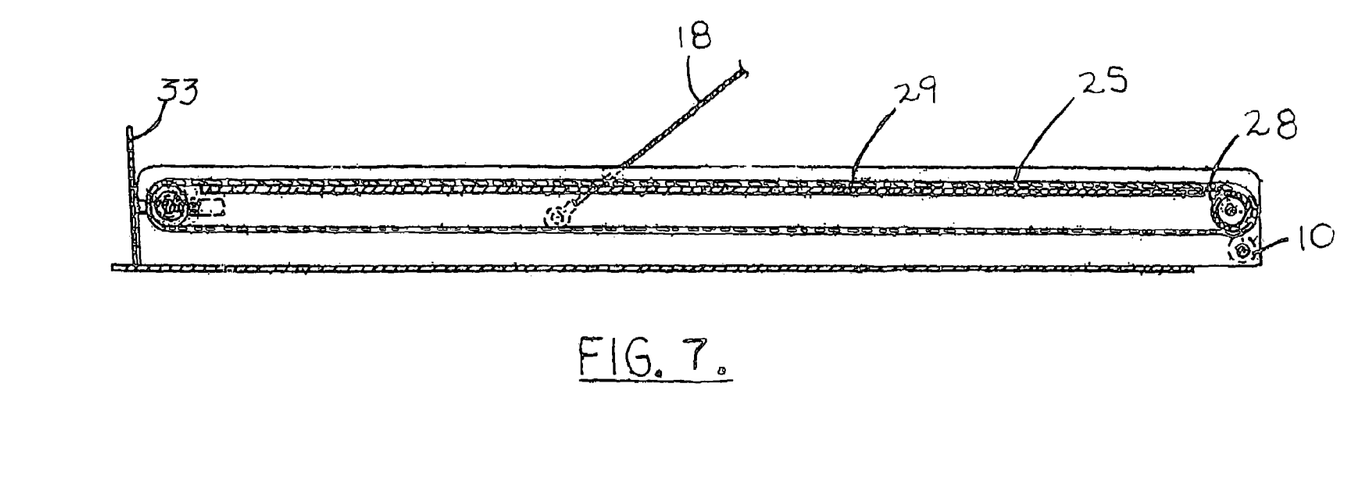
FIG. 7 is a cross-sectional view taken along section lines 7—7 in FIG. 6.

Referring now to FIGS. 3–5, a preferred mechanism for raising and lowering chute assembly 9 is illustrated. More particularly, a conventional bi-directional or reversible motor 11 is attached to the inside surface 12 of side wall 4. Motor 11 is operatively attached to a dual wire reel assembly 13 by conventional chain-and-sprocket means 14. Reel assembly 13 includes two reels 15 and 16 each having a spool of cable 17 and 18 attached at one end to a respective reel. The opposite end of cables 17 and 18 are attached to chute side wall plates 19 and 20, respectively. In a more preferred embodiment cables 17 and 18 are attached to plates 19 and 20, respectively, at a position opposite reel assembly 13 when chute assembly 9 is in a raised position.

In a preferred embodiment chute assembly 9 is constructed having a bottom plate 21 from which extend upwardly the two side wall plates 19 and 20 to form a U-shaped chute having a width to accommodate most passenger suitcases 22 and other carry-on articles. In its basic form the carry-on articles will slide down the chute by gravity. However, it is preferred that either a conventional conveyor roller unit 23 or conventional conveyor belt unit 24 (see FIGS. 6–9) be affixed to chute assembly 9 within the chute above the bottom plate 21. The roller unit 23 comprises rows of rollers 25 positioned to rotate about axles 26 suspended above the bottom plate 21 by brackets 27.

Referring to FIGS. 6–9, chute assembly 9 includes the use of conventional conveyor belt unit 24. In this embodiment unit 24 includes a continuous belt 25 mounted on rollers 28. In a preferred embodiment support plate 29 is affixed to and extends between side plates 19 and 20 to act as a support for belt 25. In this manner belt 25 will remain substantially level even with the weight of any baggage placed on belt 25. In another preferred embodiment at least one of rollers 28 will be driven by a motor 30 operatively connected directly to the roller. In a preferred embodiment motor 30 is a reversible motor to permit the conveyor to transport the baggage both to and from the bridge cabin and the ground level. In another preferred embodiment operation of the belt 25 and the motor 11 is controllable by control unit 31 that is accessible by ground personnel. A second control unit (not shown) can be located in the cab control cubicle 32 (see FIG. 10). Alternatively, or in addition to control unit 31, a conventional sensor device 31A, such as a laser beam sensor or similar type sensor, can be attached to side plate 19 at a position to detect when a bag has reached the lower end section of the chute. The sensor device 31A is operatively connected to the conveyor belt unit motor 11 to permit the conveyor belt unit to be started or stopped upon receiving a predetermined signal from the sensor device 31A.

Figures 8, 9:
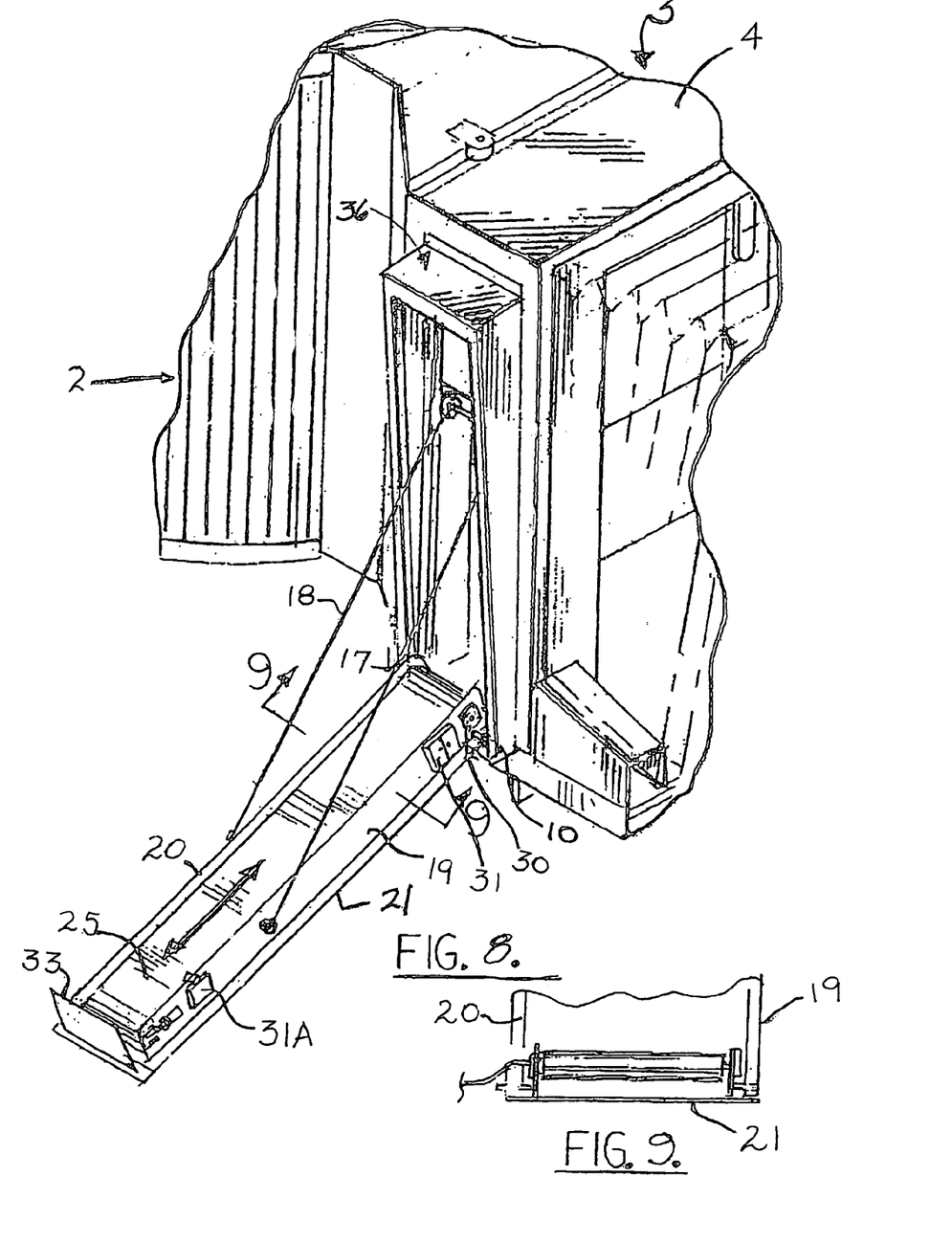
FIG. 8 is a partial three-quarter view of a bridge cab having the chute assembly pivotally attached to a forward cabin wall wherein the chute is fitted with a conveyor belt unit and an end bumper plate.
FIG. 9 is a cross-sectional view taken along section lines 9—9 in FIG. 8.

In an another preferred embodiment of the chute assembly 9 it is preferred that an end bumper plate 33 be placed across side plates 19 and 20 and at a position to prevent baggage or other carry-on articles from dropping from roller assembly 23 or belt 25 to the ground.

Figure 10:
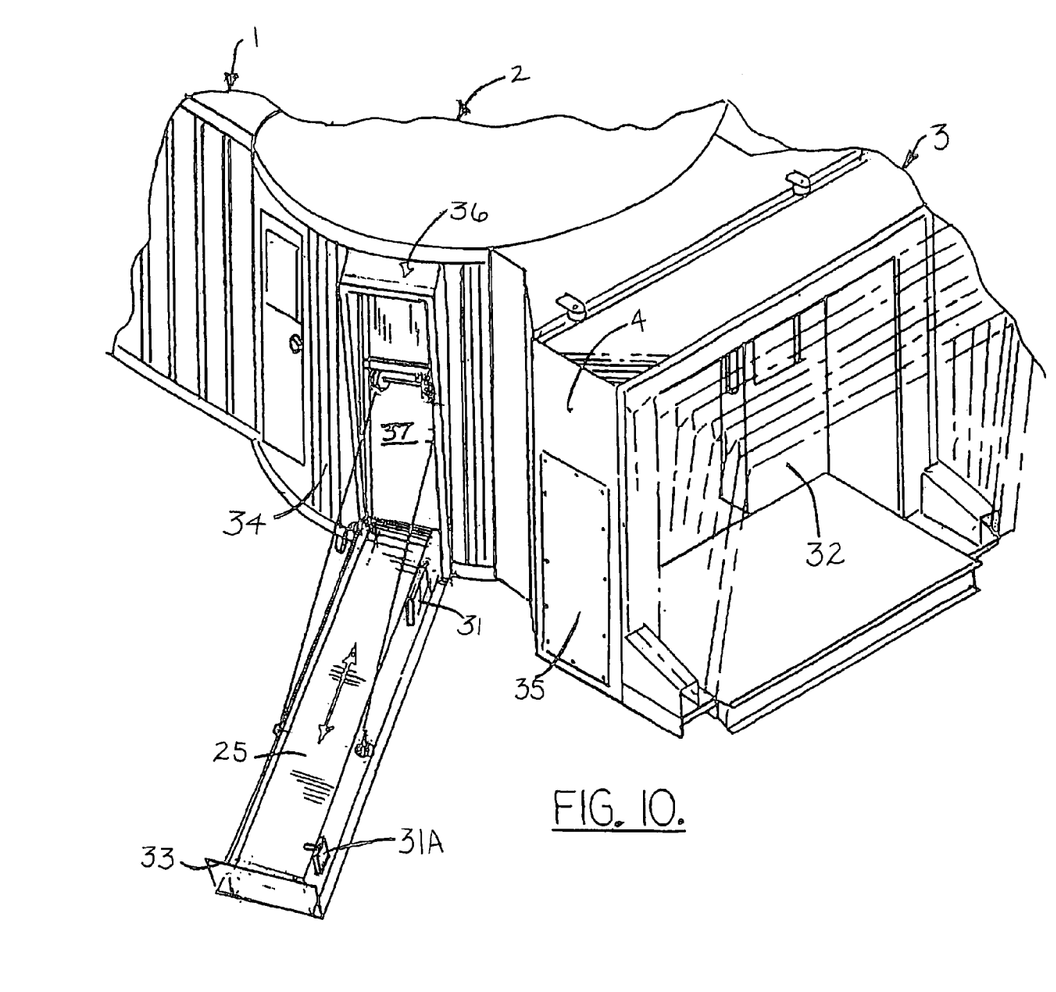
FIG. 10 is a partial three-quarter view of a bridge cabin having the chute lowered from a wall panel in the bubble cabin.

As illustrated in FIG. 10, in an alternate embodiment chute assembly 9 can be formed in one of the side walls 34 forming bubble cabin 2. If desired a second chute assembly 9 could also be formed in side wall 4 of the forward cabin 3 where indicated by cover plate 35.

To reduce rain, snow or sleet from entering the cab it is preferred that a canopy 36 be constructed over the wall opening 37 formed when chute assembly 9 has been lowered. Canopy 36 includes side panels 37 and 38, as well as top panel 39. In a more preferred embodiment that avoids chute assembly 9 from reducing the space within either cab 2 or forward cabin 3, panels 37, 38 and 39 are sized to form a cavity outside the interior of either bubble cabin 2 or forward cabin 3 large enough to accommodate chute assembly 9 when it is in a raised position. In this embodiment chute assembly 9 would not protrude into either bubble cabin 2 or forward cabin 3.

There are of course other alternate embodiments which are obvious from the foregoing descriptions of the invention which are intended to be included within the scope of the invention as defined by the following claims.

We claim:

1. In an aircraft passenger boarding bridge having a walkway of one or more sections, the walkway connectable at one end to a passenger gathering area to permit the passengers to enter or exit the walkway and connectable at its other end to a bridge cabin having a passageway permitting passengers to board or exit from an aircraft whose passenger boarding doorway is positioned adjacent one end of the passageway, the improvement to which comprises the bridge cabin having side walls wherein one of the side walls has a chute assembly pivotally attached at its lower end to the bridge cabin to permit the assembly to be pivoted outward from the bridge cabin and toward the ground.

2. In an aircraft boarding bridge according to claim 1 wherein a control unit is operatively attached to the chute assembly to activate the chute assembly to pivot, the control unit being positioned for use by a person located at ground level.

3. In an aircraft passenger boarding bridge according to claim 1 wherein the bridge cabin comprises a forward cabin operatively attached to a bubble cabin; the bubble cabin and the forward cabin having side walls forming a bridge cabin passageway, and wherein the chute assembly being pivotally attached to one of the side walls, the one of the side walls having an exterior surface facing from the bridge cabin passageway and in a direction generally toward the rear of an aircraft when the forward cabin is positioned adjacent the aircraft.

4. In an aircraft boarding bridge according to claim 3 wherein the forward cabin having parallel side walls forming a forward cabin passageway extending from the first section, and wherein the chute assembly is pivotally attached to the forward cabin side wall whose exterior surface faces toward the rear of the aircraft when the forward cabin is positioned adjacent the aircraft.

5. In an aircraft boarding bridge according to claim 1 wherein the chute assembly having a frame including a generally flat bottom plate with side bumper plates extending upward from the bottom plate to form a chute to permit baggage or other articles to move within the chute.

6. In an aircraft boarding bridge according to claim 5 wherein a conveyor roller unit is mounted above the bottom plate to assist the movement of any baggage or other articles upward or downward in the chute.

7. In an aircraft boarding bridge according to claim 5 wherein an end bumper plate is attached to and extends upward from the bottom plate, the end bumper plate extending between the side plates and positioned to prevent any luggage or other articles from exiting the chute and striking the ground.

8. In an aircraft boarding bridge according to claim 5 wherein a conveyor belt unit is mounted above the bottom plate to assist the movement of any baggage or other articles within in the chute.

9. In an aircraft boarding bridge according to claim 8 wherein operation of the baggage conveyor unit is controlled by a control unit positioned for use by a person located at ground level.

10. In an aircraft boarding bridge according to claim 8 wherein
   a. the conveyor belt unit includes a continuous belt fitted about a series of rollers and includes a motor operatively attached to one or more of the rollers to cause the belt to rotate about the series of rollers, and
   b. further comprises a censor attached to the baggage conveyor at a position to detect when baggage or other article has reached a predetermined position on the belt, the censor operatively connected to the motor to cause the motor to start, stop, or reverse the rotation of the belt about the series of rollers.

11. In an aircraft boarding bridge according to claim 10 wherein the motor is a reversible motor.

12. A bridge cabin for use with an aircraft passenger boarding bridge having a walkway, the improvement to which comprises the bridge cabin having side walls wherein one of the side walls has a chute assembly pivotally attached at its lower end to the bridge cabin to permit the assembly to be pivoted outward from the bridge cabin and toward the ground.

13. A bridge cabin according to claim 12 wherein the bridge cabin comprises a forward cabin operatively attached to a bubble cabin; the bubble cabin and the forward cabin having side walls forming a bridge cabin passageway, and wherein the chute assembly being pivotally attached to one of the side walls, the one of the side walls having an exterior surface facing from the bridge cabin passageway and in a direction generally toward the rear of an aircraft when the forward cabin is positioned adjacent the aircraft.

14. A bridge cabin according to claim 13 wherein the forward cabin having parallel side walls forming a forward cabin passageway extending from the first section, and wherein the chute assembly being pivotally attached to one of the forward cabin side walls whose exterior surface, the one of the forward cabin side walls having an exterior surface facing from the forward cabin passageway and toward the rear of an aircraft when the forward cabin is positioned adjacent the aircraft.

15. A bridge cabin according to claim 13 wherein the chute assembly having a frame including a generally flat bottom plate with side bumper plates extending upward from the bottom plate to form a chute to permit baggage or other articles to move within the chute.

16. A bridge frame according to claim 15 wherein a conveyor roller unit is mounted above the bottom plate to assist the movement of any baggage or other articles upward or downward in the chute.

17. A bridge cabin according to claim 16 wherein
a. the conveyor belt unit includes a continuous belt fitted about a series of rollers and includes a motor operatively attached to one or more of the rollers to cause the belt to rotate about the series of rollers, and
b. further comprises a censor attached to the baggage conveyor at a position to detect when baggage or other article has reached a predetermined position on the belt, the censor operatively connected to the motor to cause the motor to start, stop, or reverse the rotation of the belt about the series of rollers.

18. A bridge cabin according to claim 17 wherein the motor is a reversible motor.

\* \* \* \* \*